United States Patent
Bonkoski et al.

(10) Patent No.: US 11,383,704 B2
(45) Date of Patent: Jul. 12, 2022

(54) ENHANCED VEHICLE OPERATION

(71) Applicant: Ford Global Technologies, LLC, Dearborn, MI (US)

(72) Inventors: Phillip Bonkoski, Ann Arbor, MI (US); Mrdjan J. Jankovic, Birmingham, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 409 days.

(21) Appl. No.: 16/542,581

(22) Filed: Aug. 16, 2019

(65) Prior Publication Data
US 2021/0046925 A1  Feb. 18, 2021

(51) Int. Cl.
*B60W 30/09* (2012.01)
*B60W 10/20* (2006.01)
*B60W 10/18* (2012.01)
*B60W 10/04* (2006.01)
*B60W 30/095* (2012.01)

(52) U.S. Cl.
CPC ........... *B60W 30/09* (2013.01); *B60W 10/04* (2013.01); *B60W 10/18* (2013.01); *B60W 10/20* (2013.01); *B60W 30/0956* (2013.01); *B60W 2554/80* (2020.02); *B60W 2710/18* (2013.01); *B60W 2710/20* (2013.01); *B60W 2720/106* (2013.01)

(58) Field of Classification Search
None
See application file for complete search history.

(56) References Cited

U.S. PATENT DOCUMENTS

| | | | |
|---|---|---|---|
| 5,375,059 A | 12/1994 | Kyrtsos et al. | |
| 6,085,151 A | 7/2000 | Farmer et al. | |
| 6,597,307 B2 | 7/2003 | Nakanishi et al. | |
| 8,280,623 B2 | 10/2012 | Trepagnier et al. | |
| 10,055,994 B2* | 8/2018 | Tomozawa | B62D 15/0285 |
| 2005/0004723 A1 | 1/2005 | Duggan et al. | |
| 2007/0080825 A1* | 4/2007 | Shiller | G08G 1/166 340/903 |
| 2010/0042269 A1 | 2/2010 | Kokkeby et al. | |
| 2012/0083947 A1 | 4/2012 | Anderson et al. | |
| 2012/0232739 A1* | 9/2012 | Takahashi | B25J 5/007 701/25 |
| 2021/0221405 A1* | 7/2021 | Zhu | B60W 60/00274 |

* cited by examiner

Primary Examiner — Todd Melton
Assistant Examiner — Jason R Roberson
(74) Attorney, Agent, or Firm — Frank A. MacKenzie; Bejin Bieneman PLC

(57) ABSTRACT

A computer includes a processor and a memory, the memory storing instructions executable by the processor to generate an ellipse around a target vehicle, identify an intersection point between the ellipse and a line extending from a host vehicle to the target vehicle, identify a line tangent to the ellipse at the intersection point, and actuate one or more components of the host vehicle to avoid locations represented by the line tangent to the ellipse.

20 Claims, 6 Drawing Sheets

ENHANCED VEHICLE OPERATION

BACKGROUND

A vehicle can include sensors to collect data of an environment surrounding the vehicle. A computer in the vehicle can use the data to operate the vehicle. For example, the computer can operate the vehicle to follow a path. In another example, the computer can detect a target vehicle approaching the vehicle. A path of the target vehicle may intersect with a path of the vehicle. The computer may perform collision mitigation and avoidance between the vehicle and the target vehicle.

DETAILED DESCRIPTION

Figure 1:
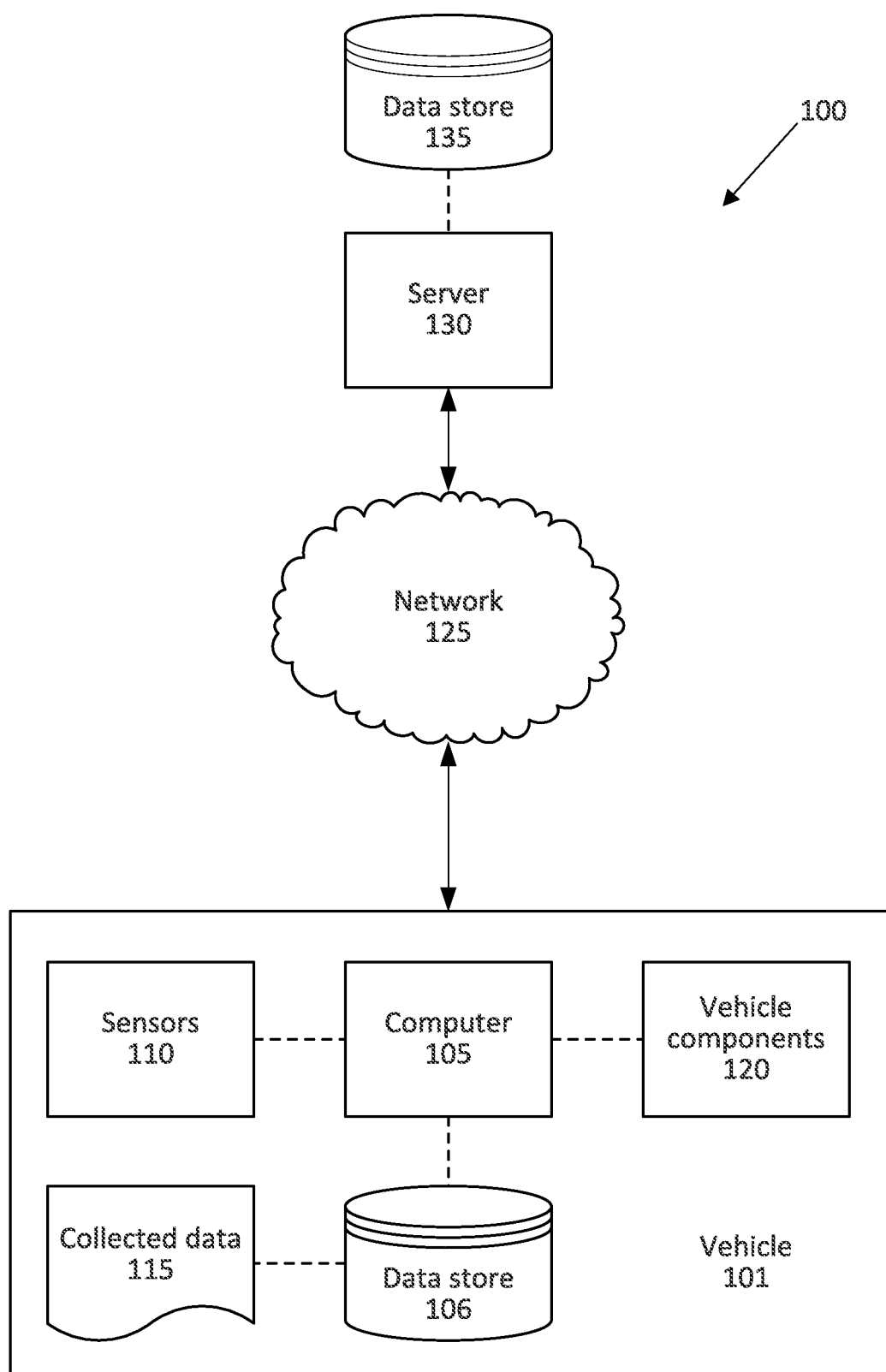
FIG. 1 is a block diagram of an example system for operating a vehicle.

A system includes a computer including a processor and a memory, the memory storing instructions executable by the processor to generate an ellipse around a target vehicle, identify an intersection point between the ellipse and a line extending from a host vehicle to the target vehicle, identify a line tangent to the ellipse at the intersection point, and actuate one or more components of the host vehicle to avoid locations represented by the line tangent to the ellipse.

The instructions can further include instructions to predict a path of the target vehicle over a period of time, predict a path of the host vehicle over the period of time, identify respective lines tangent to respective ellipses at each of a plurality of instances in the period of time, and plan actuation of the one or more components of the host vehicle to avoid each line tangent to each ellipse at each instance in the period of time.

The instructions can further include instructions to actuate the one or more components of the host vehicle according to the planned actuation and, then, after a predetermined number of instances have passed, to predict a successive path of the target vehicle over a successive period of time.

The line tangent to the ellipse can be a set of geo-coordinates and the instructions further can include instructions to plan a path for the host vehicle that avoids the geo-coordinates of the line.

The instructions can further include instructions to identify a second intersection point between the ellipse and a second line extending from the host vehicle to the target vehicle and to identify a second line tangent to the ellipse at the second intersection point.

The instructions can further include instructions to actuate the one or more components to avoid the line tangent to the ellipse and the second line tangent to the ellipse.

The instructions can further include instructions to generate the ellipse based on at least one of a heading angle of the target vehicle or a heading angle of the host vehicle.

The instructions can further include instructions to generate the ellipse based on a length of the target vehicle and a width of the target vehicle.

The instructions can further include instructions to generate the ellipse based on a speed difference between the host vehicle and the target vehicle.

The instructions can further include instructions to identify a second target vehicle, to generate a second ellipse for the second target vehicle, to identify a second line tangent to the second ellipse at a second intersection point between a second line extending from a host vehicle to the second target vehicle, and to actuate one or more components of the host vehicle to avoid the line tangent to the ellipse and the second line tangent to the second ellipse.

The instructions can further include instructions to actuate a steering motor to steer the host vehicle away from the line tangent to the ellipse.

The line tangent to the ellipse can be a constraint line and the instructions can further include instructions to input the constraint line to a path optimization program that outputs a path for the host vehicle that avoids the constraint line.

A method includes generating an ellipse around a target vehicle, identifying an intersection point between the ellipse and a line extending from a host vehicle to the target vehicle, identifying a line tangent to the ellipse at the intersection point, and actuating one or more components of the host vehicle to avoid locations represented by the line tangent to the ellipse.

The method can further include predicting a path of the target vehicle over a period of time, predict a path of the host vehicle over the period of time, identifying respective lines tangent to respective ellipses at each of a plurality of instances in the period of time, and planning actuation of the one or more components of the host vehicle to avoid each line tangent to each ellipse at each instance in the period of time.

The method can further include actuating the one or more components of the host vehicle according to the planned actuation and, then, after a predetermined number of instances have passed, predicting a successive path of the target vehicle over a successive period of time.

The line tangent to the ellipse can be a set of geo-coordinates and the method can further include planning a path for the host vehicle that avoids the geo-coordinates of the line.

The method can further include identifying a second intersection point between the ellipse and a second line extending from the host vehicle to the target vehicle and identifying a second line tangent to the ellipse at the second intersection point.

The method can further include actuating the one or more components to avoid the line tangent to the ellipse and the second line tangent to the ellipse.

The method can further include generating the ellipse based on at least one of a heading angle of the target vehicle or a heading angle of the host vehicle.

The method can further include generating the ellipse based on a length of the target vehicle and a width of the target vehicle.

The method can further include generating the ellipse based on a speed difference between the host vehicle and the target vehicle.

The method can further include identifying a second target vehicle, generating a second ellipse for the second target vehicle, identifying a second line tangent to the second ellipse at a second intersection point between a second line extending from a host vehicle to the second target vehicle, and actuating one or more components of the host vehicle to avoid the line tangent to the ellipse and the second line tangent to the second ellipse.

The method can further include actuating a steering motor to steer the host vehicle away from the line tangent to the ellipse.

The line tangent to the ellipse can be a constraint line and the instructions can further include instructions to input the constraint line to a path optimization program that outputs a path for the host vehicle that avoids the constraint line.

A system includes a host vehicle including a steering component, a propulsion, and a brake, means for generating an ellipse around a target vehicle, means for identifying an intersection point between the ellipse and a line extending from a host vehicle to the target vehicle, means for identifying a line tangent to the ellipse at the intersection point, and means for actuating one or more components of the host vehicle to avoid locations represented by the line tangent to the ellipse.

The system can further include means for predicting a path of the target vehicle over a period of time, means for predicting a path of the host vehicle over the period of time, means for identifying respective lines tangent to respective ellipses at each of a plurality of instances in the period of time, and means for planning actuation of the one or more of the steering component, the propulsion or the brake of the host vehicle to avoid each line tangent to each ellipse at each instance in the period of time.

The system can further include means for generating the ellipse based on at least one of a heading angle of the target vehicle or a heading angle of the host vehicle.

The line tangent to the ellipse can be a set of geo-coordinates and the system can further include means for planning a path for the host vehicle that avoids the geo-coordinates of the line.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

When predicting future behavior of vehicles to determine control actions to mitigate and avoid collisions, an optimization program uses constraints to determine which vehicle components to control. The constraints can be input to a cost function to output planned actuation of components to avoid the constraints as a vehicle moves along a path. Using an ellipse around a target to rotate constraints around the target allows the host vehicle to determine planned actuation of components to avoid the target. The host vehicle can continuously predict actuation of components to follow the path, begin to actuate components according to the predicted actuation, and update the predicted actuation upon receiving additional data from the target. Thus, the host vehicle continuously adjusts actuation of components to avoid locations represented by the constraints to avoid a collision with the target.

FIG. 1 illustrates an example system 100 for operating a vehicle 101. The system 100 includes a computer 105. The computer 105, typically included in a vehicle 101, is programmed to receive collected data 115 from one or more sensors 110. For example, data 115 about the vehicle 101 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, lidar, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at a server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a cleaning component, a park assist component, an adaptive cruise control component, an adaptive steering component, a movable seat, or the like. For the avoidance of doubt, note that the components 120 further include the sensors 110; the sensors 110 are identified with a separate reference numeral herein for convenience, e.g., some of the following discussion of sensors 110 involves sensing capabilities, etc., and does not pertain to other components 120.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) and/or vehicle-to-infrastructure (V2X) such as Dedicated Short Range Communications (DSRC), etc.), local area networks (LAN) and/or wide area networks (WAN), including the Internet, providing data communication services.

Figure 2:
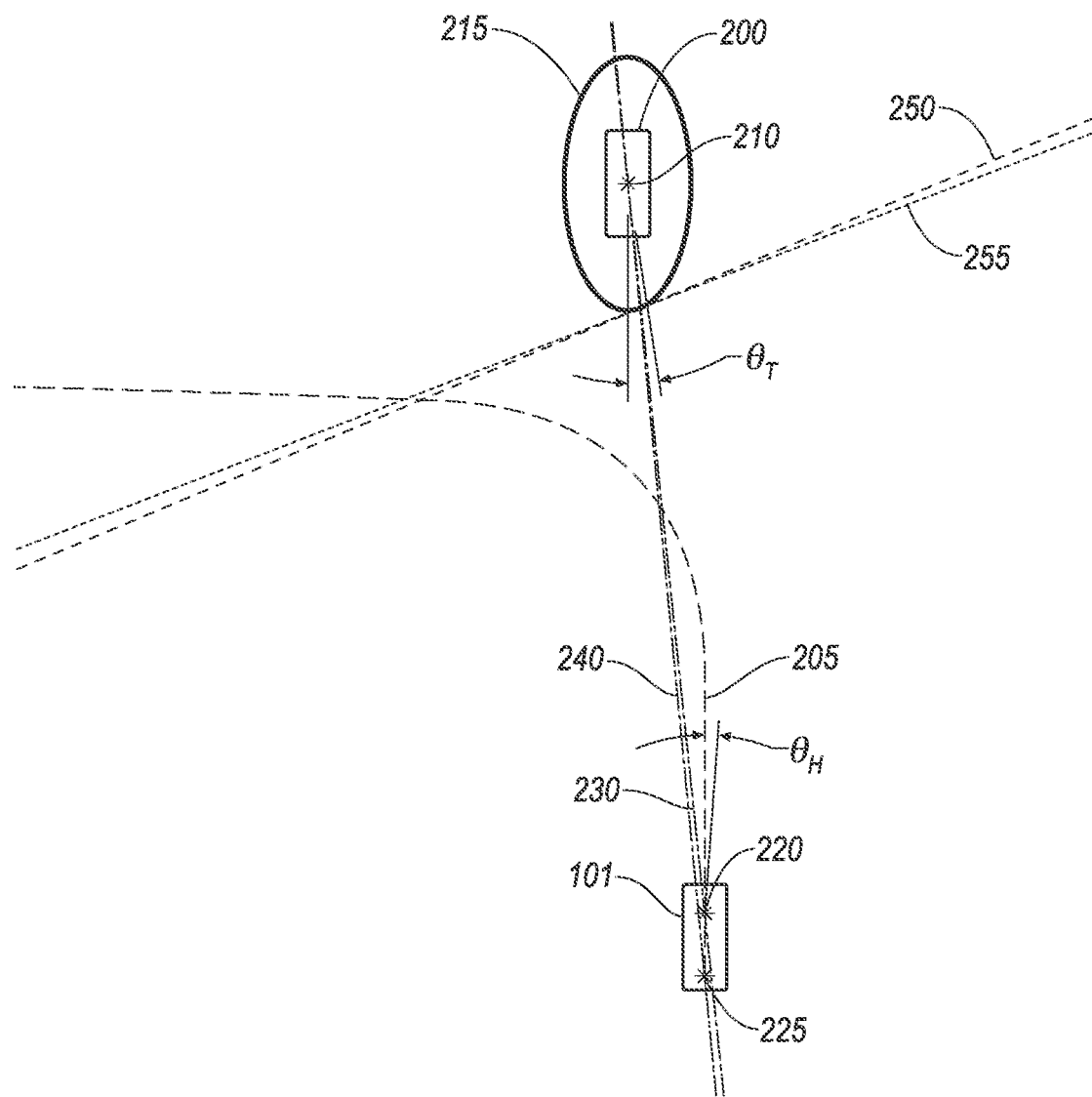
FIG. 2 is a plan view of the vehicle and a target vehicle.

FIG. 2 is a plan view of a host vehicle 101 and a target vehicle 200. The target vehicle 200 is moving toward the host vehicle 101. The computer 105 determines a planned path 205 for the vehicle 101 to follow. The path 205 is a set of geo-coordinates that the computer 105 is programmed to determine with a conventional navigation and/or path-planning algorithm. The computer 105 actuates one or more components 120 to move the vehicle 101 along the path 205. Alternatively, the computer 105 can predict the path 205 based on a trajectory of the host vehicle 101 in the manual mode. That is, the computer 105 can predict the path 205 as a straight line continuing in a current direction that the host vehicle 101 is moving at a current speed and acceleration of the host vehicle 101 or as a continuing turn in a turn direction that the host vehicle 101 is moving at the current speed and acceleration of the host vehicle 101.

The computer 105 can identify a constraint point 210 of the target vehicle 200. The constraint point 210 is a center point of an ellipse 215 generated around the target vehicle 200 and is a location on the target vehicle 200 that the computer 105 uses to perform collision avoidance, as described below. That is, an ellipse is defined with conventional Euclidean geometry as a set of points about a center point (such as the constraint point 210) satisfying a conventional equation for an ellipse including a semimajor axis a, a semiminor axis b, coordinates on a lateral axis of a coordinate system centered at the constraint point 210 $x$, and coordinates on a longitudinal axis of the coordinate system centered at the constraint point 210 $y$.

The computer 105 generates the ellipse 215 by determining semimajor and semiminor axes, as described below and shown in FIG. 3A, to generate a set of points in the coordinate system centered at the constraint point 210. The computer 105 can convert the points defining the ellipse 215 into a coordinate system centered at an origin point on the host vehicle 101 using a conventional coordinate transformation technique, e.g., translation. The origin point of the host vehicle 101 can be, e.g., a center point of the host vehicle 101, a center point of a front bumper of the host vehicle 101, a leftmost point of the front bumper of the host vehicle 101, etc. Alternatively, the origin of the coordinate system can be a fixed point relative to the host vehicle 101, e.g., a center point of the host vehicle 101 at a specified time, a center point of an intersection, etc. The constraint point 210 typically is a point substantially at a center of the target vehicle 200. Alternatively, the constraint point 210 can be a point at a different position of the target vehicle 200, e.g., at a left side of the target vehicle 200, on a right side of the target vehicle 200, on a front bumper of the target vehicle 200, on a rear bumper of the target vehicle 200, etc. In the example of FIG. 2, the target vehicle 200 has one constraint point 210 to generate a single ellipse 215 to generate constraint lines as described below. That is, the computer 105 identifies a single constraint point 210 to generate a single ellipse 215 with which to generate constraint lines to reduce computations by the computer 105 when planning actuation of components 120 to avoid the target vehicle 200.

The computer 105 can identify a constraint point 220 of the host vehicle 101. The constraint point 220 is a point on the host vehicle 101 that the computer 105 uses to perform collision avoidance, as described below. That is, the computer 105 performs collision avoidance by determining a path 205 such that the constraint point 220 of the host vehicle 101 avoids the constraint point 210 of the target vehicle 200. The computer 105 can identify a second constraint point 225 of the host vehicle 101. That is, the constraint point 220 can be on a front portion of the host vehicle 101 and the second constraint point 225 can be on a rear portion of the host vehicle 101. The computer 105 can identify the constraint points 220, 225 as specific points on the host vehicle 101 to avoid collisions with specific portions of the host vehicle 101. The computer 105 can identify the two constraint points 220, 225 as points where one or more components 120 are located. For example, the constraint point 220 can be substantially located at a propulsion 120, and the constraint point 225 can be substantially located at a fuel tank. In another example, the computer 105 can identify the constraint points 220 as locations at specific longitudinal distances from a center point of a front bumper of the host vehicle 101, e.g., 25% of the length of the host vehicle 101 from the center point of the front bumper, 75% of the length of the host vehicle 101 from the center point of the front bumper, etc. The computer 105 can perform collision avoidance such that both constraint points 220, 225 of the host vehicle 101 (i.e., both the front and the rear of the host vehicle 101) avoid the constraint point 210 of the target vehicle 200 by avoiding locations associated with the ellipse 215. In the example of FIG. 2, the computer 105 identifies two constraint points 220, 225 of the host vehicle 101 to perform collision avoidance for the front and rear of the host vehicle 101. Alternatively, the computer 105 can identify more than two constraint points to perform collision avoidance on additional portions of the host vehicle 101, e.g., four constraint points representing four corners of a substantially rectangular host vehicle 101.

The computer 105 can generate a line 230 between the constraint point 220 of the host vehicle 101 and the constraint point 210 of the target vehicle 200. The line 230 intersects with the ellipse 215 at an intersection point 235. The computer 105 can generate a second line 240 between the constraint point 225 of the host vehicle 101 and the constraint point 210 of the target vehicle 200. The second line 240 intersects with the ellipse 215 at a second intersection point 245.

The computer 105 can generate a constraint line 250 tangent to the ellipse 215 at the intersection point 235. In this context, a "constraint line" 250 is a representation of a set of geo-coordinates that the computer 105 avoids while moving the host vehicle 101 along the path 205. That is, the computer 105 is programmed to operate the host vehicle 101 without crossing the locations represented by the constraint line 250 at the time the computer 105 generates the constraint line 250. The computer 105 can input the constraint line 250 to a conventional path optimization program that outputs a path 205 that the host vehicle 101 can follow to avoid the locations represented by the constraint line. For example, the path optimization program can be a Model Predictive Control (MPC) model that predicts future behavior of the host vehicle 101 and the target vehicle 200 and minimizes a cost function, e.g., a quadratic cost function, for a linearized kinematic vehicle model to generate a path 205 for the host vehicle 101 to follow. The computer 105 generates a second constraint line 255 tangent to the ellipse 215 at the second intersection point 245. The computer 105 can input the constraint line 250 and the second constraint line 255 into the path optimization program to generate a path 205 to avoid locations represented by the constraint lines 250, 255.

The computer 105 can determine a heading angle $\theta_H$ of the host vehicle 101 and a heading angle $\theta_T$ of the target vehicle 200. In this context, the "heading angle" $\theta$ is the angle defined between a forward trajectory of a vehicle and a longitudinal axis of a predefined coordinate system. The coordinate system is a two-dimensional Cartesian coordinate system, e.g., latitude and longitude geo-coordinates. The computer 105 can determine the heading angles $\theta_H$, $\theta_T$ by predicting the respective trajectories of the host vehicle 101 and the target vehicle 200 based on data 115 collected from one or more sensors 110 (e.g., image data 115 collected by cameras 110) using a conventional technique (e.g., a CTRA model, Canny edge detection, etc.). Upon predicting the trajectories, the computer 105 can compare the trajectories to a longitudinal axis of the coordinate system to determine the heading angles $\theta_H$, $\theta_T$. In the example of FIG. 2, the heading angle $\theta_H$ indicates that the host vehicle 101 is turning to the right relative to forward motion of the host vehicle 101, i.e., away from the path 205, and the computer 105 can actuate a component 120 (e.g., a steering motor) to turn the host vehicle 101 toward the path 205. The heading angle $\theta_T$ indicates that the target vehicle 200 is turning toward the host vehicle 101.

Figure 3A:
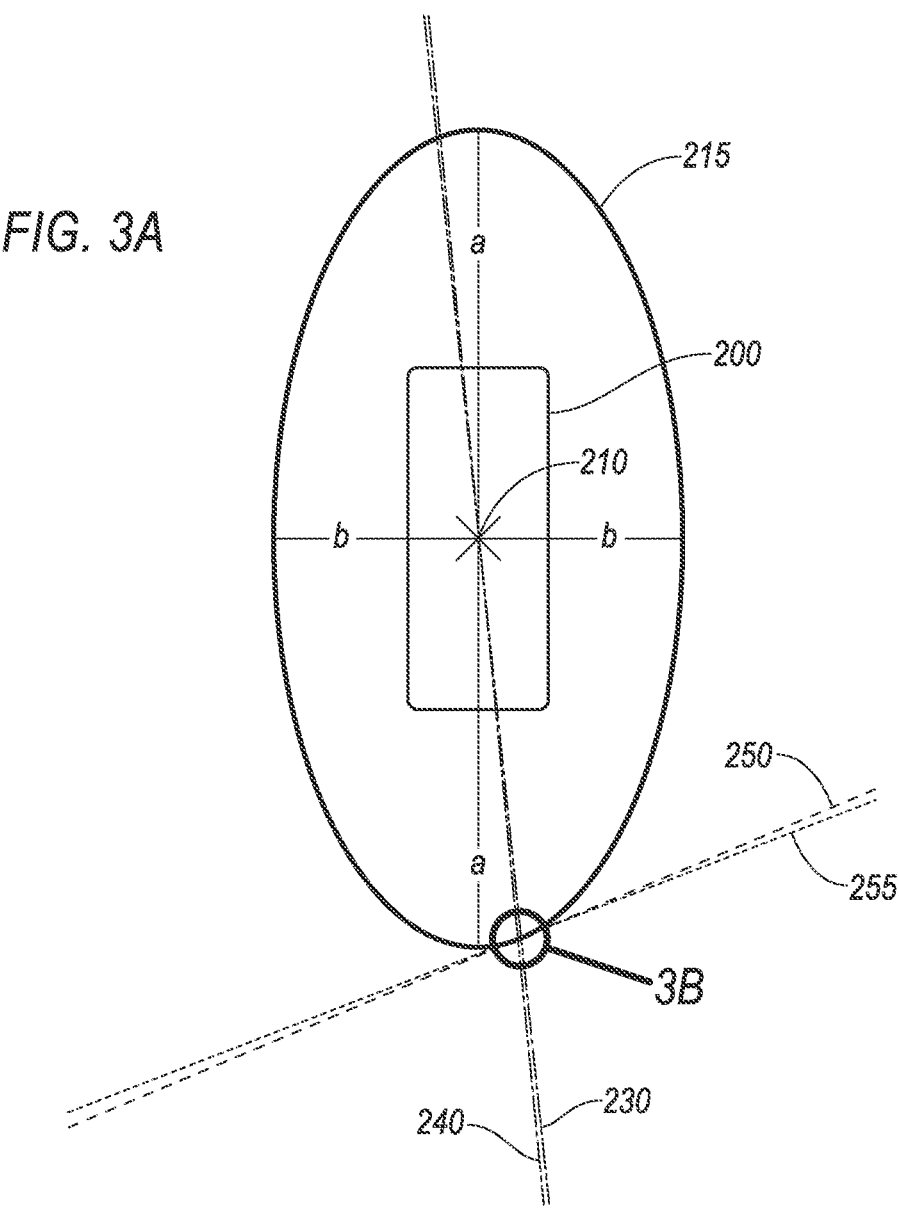
FIG. 3A is a magnified view of the target vehicle.
Figure 3B:
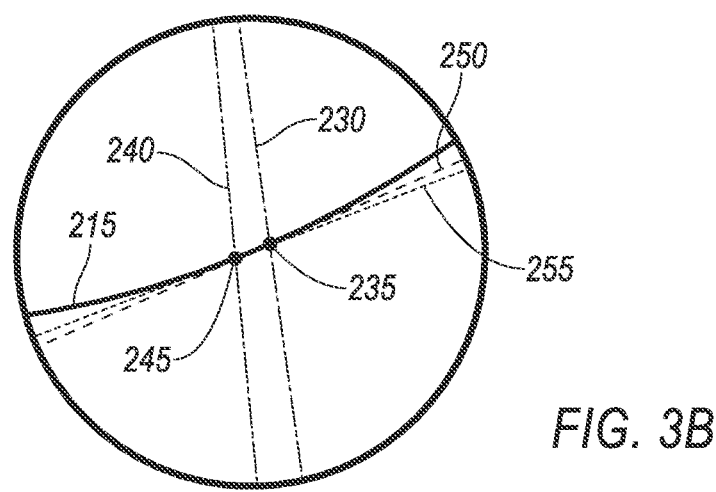
FIG. 3B is a magnified view of an ellipse surrounding the target vehicle.

FIG. 3A is a magnified view of the target vehicle 200 and the ellipse 215. FIG. 3B is a magnified view of the ellipse 215. The ellipse 215 has a semimajor axis a and a semiminor axis b. That is, the ellipse 215 is a geometric object having a center at the constraint point 210 of the target vehicle 200 defining the semimajor axis a and the semiminor axis b. The axes a, b can be determined according to the Equations below:

$$a = (c_1 + c_2|\theta_H - \theta_T|) \cdot F_v \quad (1)$$

$$b = (c_3 + c_4|\theta_H - \theta_T|) \cdot F_v \quad (2)$$

where $c_1$ is a tunable factor that controls the length of the ellipse 215, $c_3$ is a tunable factor that controls the width of the ellipse 215, $c_2$, $c_4$ are tunable factors that increase the size of the ellipse 215 based on difference between the heading angles $\theta$ of the host vehicle 101 and the target vehicle, and $F_v$ is a tunable scaling parameter that increases as the speed difference between the host vehicle 101 and the target vehicle 200 increases. For example, $c_1$ can be the length of the target vehicle 200 (e.g., 5 meters) such that the ellipse 215 is at least twice as long as the target vehicle 200, $c_3$ can be the width of the target vehicle 200 (e.g., 2 meters) such that the ellipse 215 is at least twice as wide as the target vehicle 200, and the heading angle factors $c_2$, $c_4$ can be determined based on simulation modeling of virtual host vehicle 101 and target vehicle 200 (e.g., a value between 0-5). $F_v$ can be a value that is stored in the data store 106 (e.g., as a lookup table or the like) that, when the computer 105 determines the difference in the speed between the host vehicle 101 and the target vehicle 200, the computer 105 can refer to the data store 106 to determine the corresponding value for $F_v$ for the specific difference. Alternatively, the scaling parameter $F_v$ can be a stepwise function of speed, e.g., $F_v$ can be a constant value (e.g., 1) up to a first speed threshold (e.g., 10 kph), can increase linearly between the first speed threshold and a second speed threshold (e.g., 90 kph), and can be a second constant value (e.g., 2) above the second speed threshold. The lookup table or the like and the thresholds can be determined based on simulation testing of virtual host vehicles 101 and target vehicle 200. Upon determining the semimajor axis a and the semiminor axis b, the computer 105 can generate the ellipse 215 as the set of points around the constraint point 210 along the target vehicle 200 longitudinal axis at the semimajor axis a and along the target vehicle 200 lateral axis at the semiminor axis b, i.e., using a conventional geometric algorithm for constructing an ellipse with a known center and semiaxes a, b.

Figure 4:
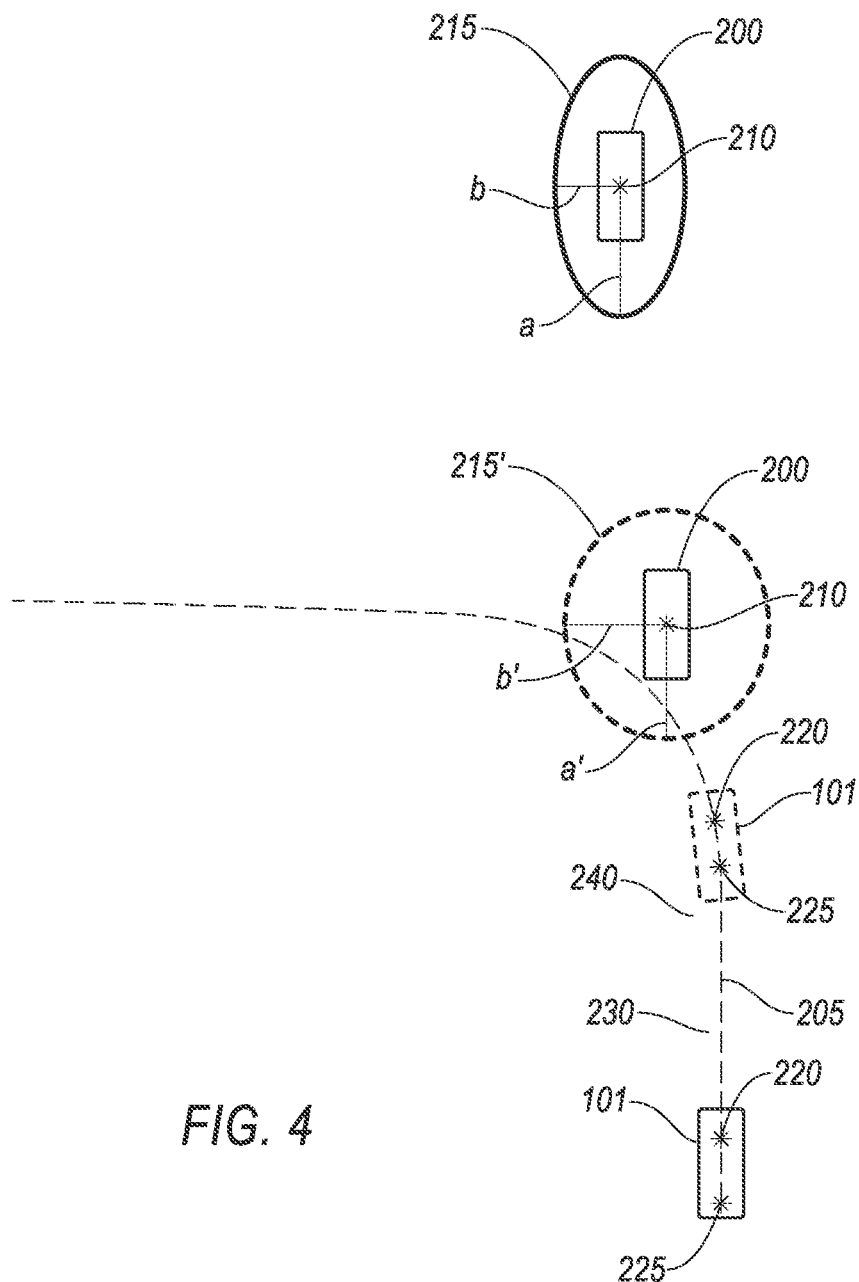
FIG. 4 is a plan view of the vehicle and the target vehicle at different times.

The computer 105 can generate a plurality of ellipses 215 and corresponding constraint lines 250, 255 at a plurality of time instances during an upcoming period of time. For example, as shown in FIG. 4 and described below, the size of the ellipse 215 can change at the upcoming period of time. That is, the computer 105 can predict the position of the host vehicle 101 and the target vehicle 200 at a plurality of time instances in the period of time, generate respective ellipses 215 at each time instance, generate respective constraint lines 250, 255 for each time instance, and plan a path 205 that avoid locations represented with the constraint lines 250, 255. For example, the computer 105 can plan the path 205 based on constraint lines 250, 255 generated at time instances spaced at intervals of 50 milliseconds (ms) over a period of time of 5000 ms. The computer 105 can then plan actuation of one or more components 120 according to the planned path 205 and actuate the components 120 according to the planned actuation. Alternatively, the computer 105 can actuate one or more components 120 according to the planned actuation for passage of a specified number of time instances (e.g., 10 instances of 50 ms) and then generate a plurality of ellipses 215 and constraint lines 250, 255 for a successive period of time (e.g., 5000 ms). That is, the computer 105 can predict a path 205 and plan actuation of components 120 for the period of time, follow the path 205 according to the planned actuation for the number of time instances, and then predict a successive path 205 for a successive period of time. Thus, the computer 105 can update predictions for the path 205 based on newly received data 115 about the target vehicle 200 from the sensors 110.

The respective sizes of the ellipses 215 can be different for different time instances, as shown in FIG. 4. That is, the size of the ellipse 215 can change for different time instances. In this context, the "size" of the ellipse is a set of the lengths of the semimajor axis a and the semiminor axis b that define the ellipse 215. In the example of FIG. 4, the target vehicle 200 defines the ellipse 215 at a first time instance and a second ellipse 215' at a second time instance approaching the host vehicle 101. As described above, the size of the ellipse 215 is based on the heading angles $\theta_H$, $\theta_T$ of the host vehicle 101 and the target vehicle 200. When approaching the host vehicle 101, the heading angles $\theta_H$, $\theta_T$ change, resulting in a new semimajor axis a' and a new semiminor axis b' that define the ellipse 215'. For example, the new semiminor axis b' is larger than the semiminor axis b, and thus the second ellipse 215' is wider than the ellipse 215.

That is, the size of the second ellipse 215' differs from the size of the ellipse 215. As the computer 105 predicts the positions of the host vehicle 101 and the target vehicle 200 over the period of time, the computer 105 can predict changes to the heading angles $\theta_H$, $\theta_T$ for each time instance. Thus, as the heading angles $\theta_H$, $\theta_T$ change for each time instance, the size of the ellipse 215 for the respective time instance can change.

The computer 105 can actuate one or more components 120 to avoid locations represented by the constraint lines 250, 255. For example, the computer 105 can actuate a steering motor 120 to steer the host vehicle 101 away from the constraint lines 250, 255. In another example, the computer 105 can actuate a brake 120 to slow the host vehicle 101 to avoid locations represented by the constraint lines 250, 255.

Figure 5:
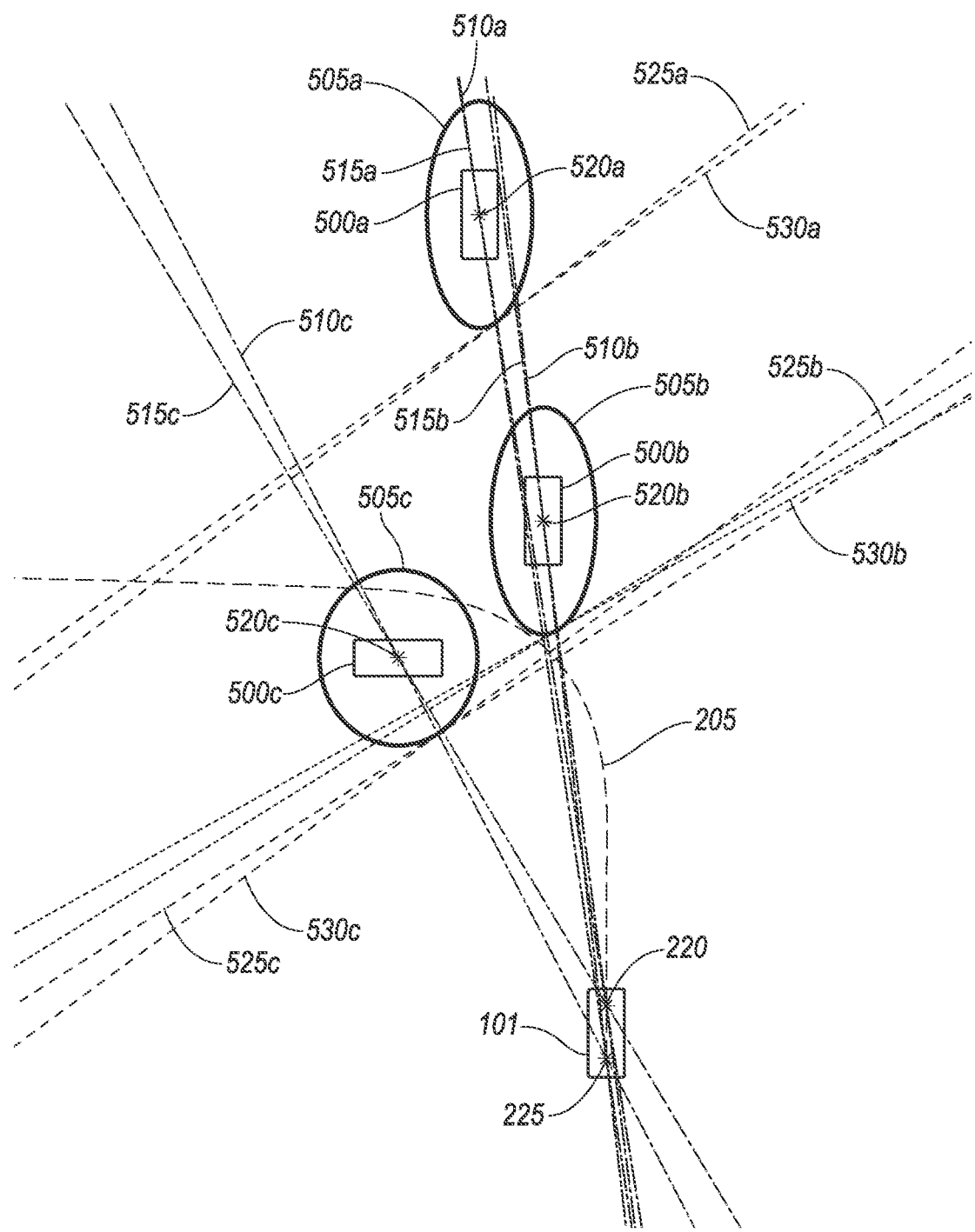
FIG. 5 is a plan view of the vehicle and a plurality of target vehicles.

FIG. 5 is a plan view of the host vehicle 101 a plurality of target vehicles 500a, 500b, 500c, collectively, target vehicles 500. The computer 105 can identify the target vehicles 500, generate respective ellipses 505a, 505b, 505c (collectively, ellipses 505) and lines 510a, 510b, 510c, 515a, 515b, 515c (collectively, lines 510, 515) for each target vehicle 500. Each target vehicle 500 has a respective constraint point 520a, 520b, 520c (collectively, constraint points 520) about which the ellipses 505 can be generated.

As described above, the computer 105 can generate constraint lines 525a, 525b, 525c, 530a, 530b, 530c (collectively, constraint lines 525, 530) tangent to the ellipses 505 at the intersection points with the lines 510, 515. Upon generating the constraint lines 525, 530, the computer 105 can input the constraint lines 525, 530 to the path optimization program to solve for a path 205 that the host vehicle 101 can follow to avoid locations represented by the constraint lines 525, 530, as described above. The computer 105 can plan actuation of one or more components 120 according to the path 205 and update the planned actuation upon following the path 205, as described above.

Figure 6:
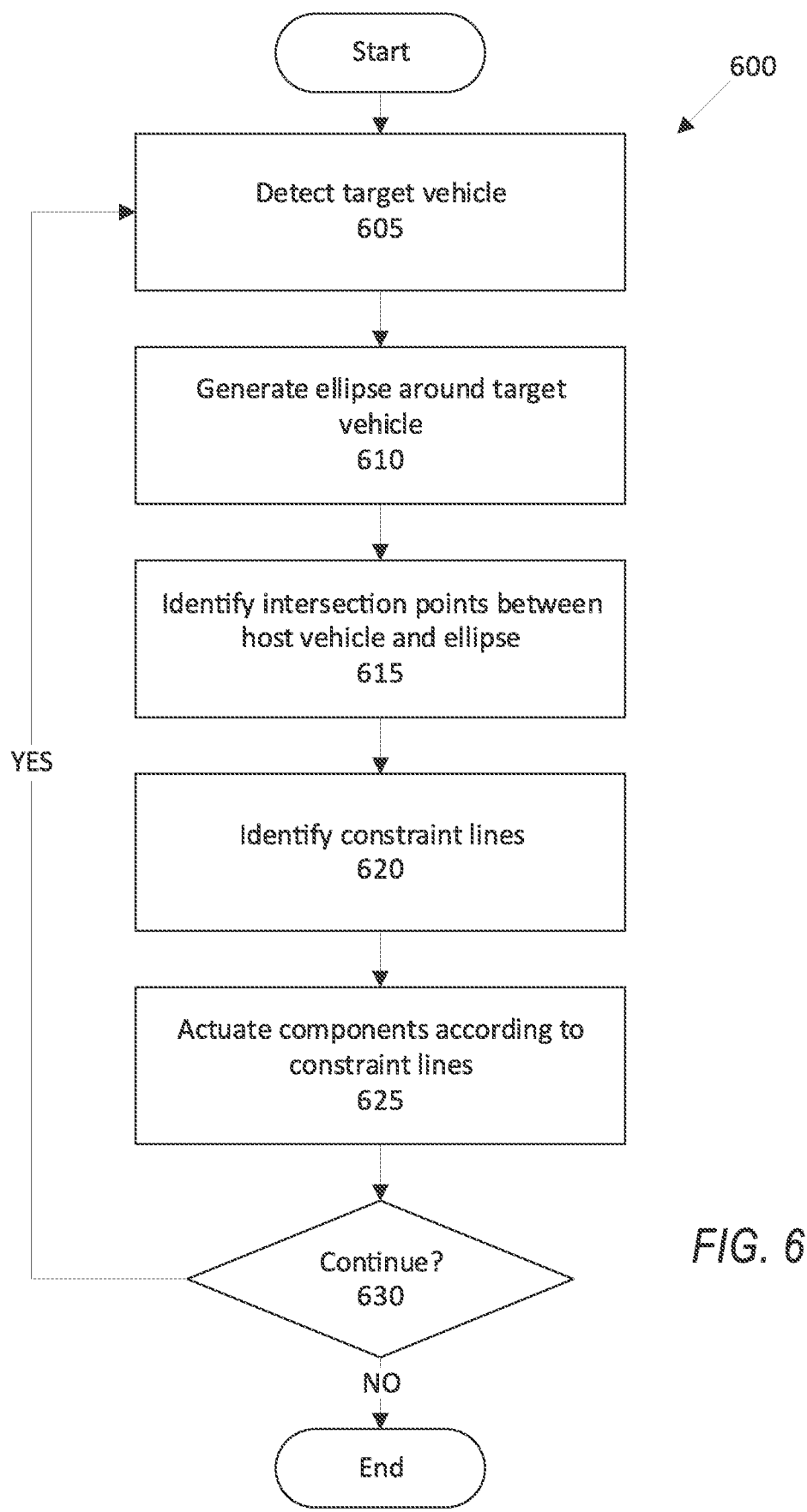
FIG. 6 is a block diagram of an example system for operating a vehicle.

FIG. 6 is a block diagram of an example process 600 for operating a vehicle 101. The process 600 begins in a block 605, in which a host vehicle 101 detects a target vehicle 200. As described above, a computer 105 of the host vehicle 101 can detect the target vehicle 200 based on data 115 collected by one or more sensors 110. For example, the computer 105 can collect image data 115 with a camera 110 and detect the target vehicle 200 based on an image-recognition technique, e.g., Canny edge detection.

Next, in a block 610, the computer 105 generates an ellipse 215 around the target vehicle 200. As described above, the computer 105 can identify a semimajor axis a and a semiminor axis b based on the length and width of the target vehicle 200 and generate an ellipse 215 about a constraint point 210 of the target vehicle 200. The constraint point 210 can be, e.g., a center point of the target vehicle 200.

Next, in a block 615, the computer 105 identifies intersection points 235, 245 between lines 230, 240 extending from constraint points 220, 225 of the host vehicle 101 and the ellipse 215. As described above, each line 230, 240 connecting the constraint points 220, 225 of the host vehicle 101 and the constraint point 210 of the target vehicle 200 intersects the ellipse 215 at a respective point, the intersection points 235, 245. The line 230 extends from the constraint point 220. The line 240 extends from the constraint point 225.

Next, in a block 620, the computer 105 identifies constraint lines 250, 255. As described above, the computer 105 identifies the constraint lines 250, 255 as lines tangent to the ellipse 215 at the intersection points 235, 245. The constraint lines 250, 255 indicate locations that the host vehicle 101 avoids to prevent a collision with the target vehicle 200.

Next, in a block 625, the computer 105 actuates one or more components 120 to follow a path 205 while avoiding locations represented by the constraint lines 250, 255. The computer 105 can input the constraint lines 250, 255 to a path optimization program that outputs planned actuation of a brake 120, a propulsion 120, and a steering component 120 to move the host vehicle 101 along the path 205 while avoiding locations represented by the constraint lines 250, 255.

Next, in a block 630, the computer 105 determines whether to continue the process 600. For example, the computer 105 can determine to continue the process 600 when the host vehicle 101 is still traveling along the path 205. If the computer 105 determines to continue, the process 600 returns to the block 605 to detect another target vehicle 200. Otherwise, the process 600 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and the server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
    generate an ellipse around a target vehicle based on at least one of (a) dimensions of the target vehicle that include a length of the target vehicle and a width of the target vehicle or (b) a speed difference between the host vehicle and the target vehicle;
    identify an intersection point between the ellipse and a line extending from the host vehicle to the target vehicle;
    identify a line tangent to the ellipse at the intersection point; and
    actuate one or more components of the host vehicle to avoid locations represented by the line tangent to the ellipse.

2. The system of claim 1, wherein the instructions further include instructions to predict a path of the target vehicle over a period of time, predict a path of the host vehicle over the period of time, identify respective lines tangent to respective ellipses at each of a plurality of instances in the period of time, and plan actuation of the one or more components of the host vehicle to avoid each line tangent to each ellipse at each instance in the period of time.

3. The system of claim 2, wherein the instructions further include instructions to actuate the one or more components of the host vehicle according to the planned actuation and, then, after a predetermined number of instances have passed, to predict a successive path of the target vehicle over a successive period of time.

4. The system of claim 1, wherein the line tangent to the ellipse is a set of geo-coordinates and the instructions further include instructions to plan a path for the host vehicle that avoids the geo-coordinates of the line.

5. The system of claim 1, wherein the instructions further include instructions to identify a second intersection point between the ellipse and a second line extending from the host vehicle to the target vehicle and to identify a second line tangent to the ellipse at the second intersection point.

6. The system of claim 5, wherein the instructions further include instructions to actuate the one or more components to avoid the line tangent to the ellipse and the second line tangent to the ellipse.

7. The system of claim 1, wherein the instructions further include instructions to generate the ellipse based on at least one of a heading angle of the target vehicle or a heading angle of the host vehicle.

8. The system of claim 1, wherein the instructions further include instructions to identify a second target vehicle, to generate a second ellipse for the second target vehicle, to identify a second line tangent to the second ellipse at a second intersection point between a second line extending from a host vehicle to the second target vehicle, and to actuate one or more components of the host vehicle to avoid the line tangent to the ellipse and the second line tangent to the second ellipse.

9. The system of claim 1, wherein the instructions further include instructions to actuate a steering motor to steer the host vehicle away from the line tangent to the ellipse.

10. The system of claim 1, wherein the line tangent to the ellipse is a constraint line and the instructions further include instructions to input the constraint line to a path optimization program that outputs a path for the host vehicle that avoids the constraint line.

11. A method, comprising:
    generating an ellipse around a target vehicle based on at least one of (a) dimensions of the target vehicle that include a length of the target vehicle and a width of the target vehicle or (b) a speed difference between the host vehicle and the target vehicle;
    identifying an intersection point between the ellipse and a line extending from a host vehicle to the target vehicle;
    identifying a line tangent to the ellipse at the intersection point; and
    actuating one or more components of the host vehicle to avoid locations represented by the line tangent to the ellipse.

12. The method of claim 11, further comprising predicting a path of the target vehicle over a period of time, predicting a path of the host vehicle over the period of time, identifying respective lines tangent to respective ellipses at each of a plurality of instances in the period of time, and planning actuation of the one or more components of the host vehicle to avoid each line tangent to each ellipse at each instance in the period of time.

13. The method of claim 11, further comprising generating the ellipse based on at least one of a heading angle of the target vehicle or a heading angle of the host vehicle.

14. The method of claim 11, wherein the line tangent to the ellipse is a set of geo-coordinates and the method further comprises planning a path for the host vehicle that avoids the geo-coordinates of the line.

15. A system, comprising a computer including a processor and a memory, the memory storing instructions executable by the processor to:
    generate an ellipse around a target vehicle;
    identify an intersection point between the ellipse and a line extending from a host vehicle to the target vehicle;
    identify a second intersection point between the ellipse and a second line extending from the host vehicle to the target vehicle;

identify a second line tangent to the ellipse at the second intersection point identify a line tangent to the ellipse at the intersection point; and actuate one or more components of the host vehicle to avoid locations represented by the line tangent to the ellipse.

16. The system of claim 15, wherein the instructions further include instructions to actuate the one or more components to avoid the line tangent to the ellipse and the second line tangent to the ellipse.

17. The system of claim 15, wherein the instructions further include instructions to predict a path of the target vehicle over a period of time, predict a path of the host vehicle over the period of time, identify respective lines tangent to respective ellipses at each of a plurality of instances in the period of time, and plan actuation of the one or more components of the host vehicle to avoid each line tangent to each ellipse at each instance in the period of time.

18. The system of claim 17, wherein the instructions further include instructions to actuate the one or more components of the host vehicle according to the planned actuation and, then, after a predetermined number of instances have passed, to predict a successive path of the target vehicle over a successive period of time.

19. The system of claim 15, wherein the instructions further include instructions to generate the ellipse based on a length of the target vehicle and a width of the target vehicle.

20. The system of claim 15, wherein the instructions further include instructions to generate the ellipse based on a speed difference between the host vehicle and the target vehicle.

* * * * *